April 30, 1946.    J. L. RUSSELL    2,399,574

SPEED REGULATING DEVICE

Filed May 12, 1943

INVENTOR.
JOHN L. RUSSELL
BY
E.C. Sanborn
Attorney

Patented Apr. 30, 1946

2,399,574

UNITED STATES PATENT OFFICE 2,399,574

SPEED REGULATING DEVICE

John L. Russell, Naugatuck, Conn., assignor to The Bristol Company, Waterbury, Conn., a corporation of Connecticut Application May 12, 1943, Serial No. 486,687

17 Claims. (Cl. 172—293)

This invention relates to speed regulating devices, and more especially to means for maintaining the mean velocity of an electrical motor at a constant speed as determined by a clock mechanism having an escapement of the conventional type. The speed of a non-synchronous electrical motor is subject to a number of influences which may tend to introduce variations in its velocity, so that a constant speed cannot be maintained without the addition of accessory means. Among these influences may be mentioned the effects of voltage variation, change in load, and temperature of the windings. In addition to these, an alternating-current motor of any kind is more or less subject to variations in the frequency of the source of supply.

In the operation of many mechanisms, such as a timing controller or the chart drive of a recording instrument, there is required an amount of power often in excess of that available from a spring-, or weight-, driven clock of the conventional type. Where alternating current of a precisely regulated frequency is available, a synchronous motor of any one of the well-known types available for such applications, provides a source of power eminently suited to the purpose; but where the only available electrical power supply is either direct current or alternating current of a non-regulated frequency, it is imperative that a motor for the purpose of driving any form of a timing mechanism over an extended interval be provided with regulating means capable of maintaining the speed of the motor, or of the mechanism driven thereby, at a much more constant value than is inherent in the self-regulating properties of the motor.

It is an object of this invention to provide means whereby the speed of an electrical motor can be controlled by means of an escapement deriving its power from the motor.

It is a further object to provide a speed regulating device of the above nature in which the mean velocity of the motor will not be affected by wide changes in the value of the driven load, even to the extent of the load acquiring a negative value and tending to deliver mechanical power to the shaft of the motor.

It is a further object to provide a speed regulating device in which the circuits of the motor are controlled through contact means essentially intermittent in their action and tending to effect regulation of the motor by virtue of durations of intervals of engagement in each of a multiplicity of successive cycles of operation.

It is a further object to provide a speed regulating device of the above nature in which the contacting means shall be subject to positive operation whereby sticking or chattering of the contact surfaces is definitely eliminated.

In the drawing—

Figure 1:
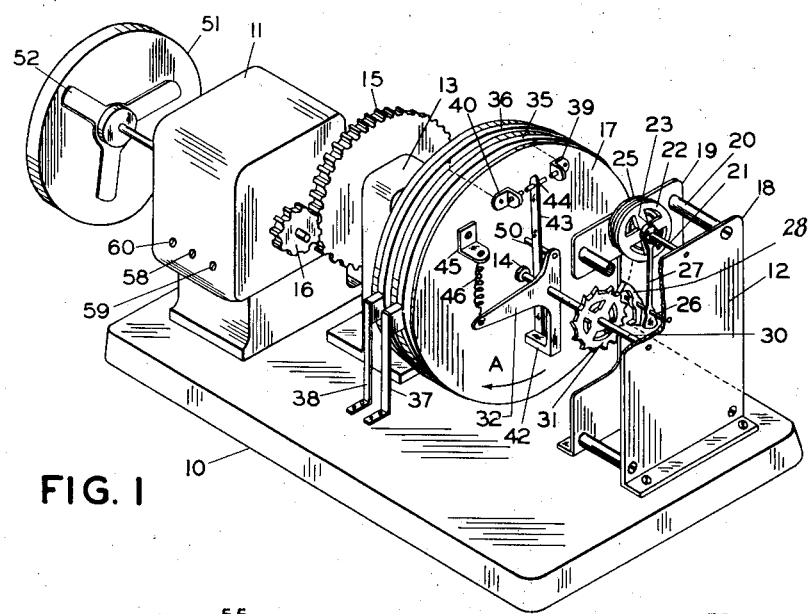
Fig. 1 is a perspective drawing of a speed regulating device embodying the principles of the invention.

Referring now to the drawing:

The numeral 10 in Fig. 1 designates a base member upon which are mounted an electric motor 11, the speed of whose rotation is required to be regulated, a clock mechanism 12, the escapement of which is utilized for the purpose of effecting the desired regulation, and various other elements, the nature and purpose of which will hereinafter be fully set forth and described. Mounted upon the base 10 is a pedestal 13 having journaled therein a shaft 14 to which are fixed a gear member 15 meshing with a pinion 16 on the shaft of the motor 11, and a drum member 17 formed preferably of Bakelite or similar insulating material, and having both cylindrical and flat faces to which may be attached certain elements of the regulatory mechanism.

The clock mechanism 12 comprises end plates 18 and 19 maintained in fixed relative relationship by pillars 20. Pivotally journaled between the plates 18 and 19 is a shaft 21 having fixed thereto a balance wheel 22 and an arbor 23 carrying an impulse-pin 24 parallel to, but axially displaced from, the shaft 21. Extended between the shaft 21 and the end plate 19 is a spiral hair spring 25, whereby the shaft 21 and the assembly carried thereby is given an oscillatory characteristic. Suitably positioned between, and journaled in, the end plates 18 and 19, is a shaft 26 having fixed thereto a lever 27 and a verge 28. The lever 27 terminates at one extremity in a fork 29 adapted to engage the impulse-pin 24, whereby motion may be communicated to the balance wheel 22 and other elements carried by the shaft 21. A shaft or spindle 30, coaxially disposed with respect to the shaft 14, has one of its extremities journaled in the end of said shaft, and its other extremity journaled in the end plate 18 of the clock mechanism 12. Fixed to the shaft 30 are a scape wheel 31 and a lever structure 32. The verge 28 is provided with pallets 33 adapted to engage the teeth of the scape wheel 31, thereby completing an escapement of the conventional type, whose natural oscillatory period may be utilized to control precisely and definitely the average speed of intermittent motion imparted to the shaft 30.

Mounted upon the cylindrical surface of the drum 17 are collector rings 35 and 36 engaging brush elements 37 and 38 respectively mounted upon, but insulated from, the base member 10. Mounted upon the flat face of the drum 17 toward the clock mechanism 12 are electrical contacts 39 and 40 connected respectively to the collector rings 35 and 36. The lever structure 32 includes a projecting arm 42 having mounted thereon a resilient leaf spring 43 terminating in a double contact 44 positioned between the contacts 39 and 40 carried by the drum 17, and adapted to engage either one of said contacts or to float freely between the same. Mounted upon the aforementioned flat face of the drum 17 is a bracket 45 having attached thereto one end of a tension spring 46, the other end of which is attached to a radially projecting part of the lever structure 32. The relative disposition of parts carried by the drum 17 and those carried by the shaft 30 is such that upon said drum mechanism being rotated in the sense indicated by arrow A, force will be imparted by the bracket 45 carried upon the drum 17 through the spring 46 to the lever structure 32, whereby the shaft 30 will tend to rotate in the same direction as the shaft 14, and will cause the escapement of the clock mechanism 12 to oscillate in a manner to limit the mean velocity of said shaft 30 to a value determined by the natural period of the escapement. If the shaft 14 should tend to gain upon the shaft 30, the contact 40, carried by the drum 17, will be advanced to a position with respect to the contact 44 carried by the spring 43 so that said contacts will be brought into engagement. If, on the other hand, the shaft 14 should tend to lag behind the shaft 30, the contacts 44 and 39 will be brought into electrical engagement. The spring 43 is normally tensioned to rest against a stop member 50 carried by the lever structure 32 and so disposed that when contact 39 engages contact 44 the spring member 43 will be forced backward from engagement with the stop member 50, and when the drum 17 carrying the contact 39 advances with respect to the shaft 30, the leaf spring 43 will maintain the contact 44 in engagement with the contact 39 until said leaf spring engages the stop member 50, causing the engagement between contacts 39 and 44 to be quickly broken.

Mounted upon the shaft of the motor 11 is a fly wheel 51 having considerable inertia. Mechanical engagement between the fly wheel 51 and the shaft of the motor is maintained by means of a friction washer 52 which may be adjusted from a condition wherein the fly wheel 51 will rotate freely upon the motor shaft to a condition wherein said fly wheel is firmly fixed to said shaft.

Figure 2:
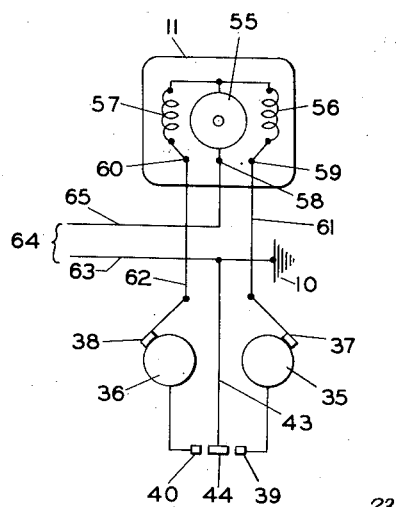
Figs. 2 and 3 are diagrams of electrical circuits alternatively applicable to the devices illustrated in Fig. 1.

The method by which the contact arrangement is caused to regulate the speed of the motor 11 may involve any one of a variety of circuit combinations, depending upon the type of motor used and upon the load conditions encountered. In Fig. 2 is shown one method of control especially applicable to use with a reversible motor and in an installation where the driven load is of such a nature that it may at times become a source of power, tending to rotate the motor. The motor 11 is provided with an armature or equivalent winding 55, and two field windings 56 and 57, said three windings having a common point of connection and having their free terminals brought to posts 58, 59 and 60 respectively. The internal connections of the motor are such that when electrical power is applied between the posts 58 and 59 the mechanism driven by the motor will tend to rotate in a "forward" direction as indicated by the arrow A in Fig. 1, and when power is applied between the terminals 58 and 60 the motor will tend to rotate said mechanism in a "backward" direction or in opposition to said arrow. The brush element 37 is connected to the binding post 59 by means of a conductor 61, and the brush element 38 is connected to the binding post 60 by means of a conductor 62. While, in actual practice it has been found expedient to insulate the leaf spring 43, carrying the contact 44, from other metallic parts of the mechanism, and to provide electrical connection thereto through a collector ring and brush, for purposes of clarity, this part of the apparatus has been shown in the drawing as "grounded" to the mechanism, whereby the latter, including the mounting plate 10, becomes a part of the electrical circuit. A conductor 63 attached to the mounting plate 10 is connected to one side of an electrical power source 64, and a conductor 65 attached to the binding post 58 on the motor 11 is connected to the other side of said source.

In studying the operation of the speed regulating device as thus far disclosed, the apparatus may first be considered as in a condition of rest, with no power applied at the source 64. Under this condition the spring 46 will rotate the lever structure 32 in the direction of the arrow A in Fig. 1, bringing the contact 44 firmly into engagement with the contact 39 and holding the stop 50 out of engagement with the leaf spring 43, whereby the resilient force of the whole length of said spring is available for maintaining engagement between said contacts 44 and 39, and opposing the rotative effort of the tension spring 46. With a condition of equilibrium thus established, there will be no force available for driving the escapement, and the clock mechanism 12 will remain at rest. Upon power being applied from the source 64 to the conductors 63 and 65, current will flow through the circuit comprising the contacts 44 and 39, the collector ring 35, the brush 37, the conductor 61, and the windings 56 and 55 of the motor 11. The motor will thus be caused to operate in a sense to rotate the drum 17 in a "forward" direction as indicated by the arrow A, tending to separate the contact 39 from the contact 44, but at the same time developing a tension upon the spring 46, whereby the lever structure 32 will tend to be rotated in the same angular sense as the drum 17. The torque developed upon the shaft 30 by the turning moment exerted upon the lever structure 32 will be transmitted to the scape wheel 31, causing the associated escapement mechanism to become active and allowing the shaft 30 to be rotated by uniformly spaced increments determined by the natural oscillatory period of the balance wheel 22 in conjunction with the hair-spring 25. Thus, while the tendency of the drum 17 and other elements directly driven by the motor 11 is to rotate at a steady speed, the tendency of the lever structure 32 and all parts mechanically associated therewith will be to rotate intermittently in definite angular increments but at a constant average velocity.

The characteristics of the motor circuit are so adjusted that, under continuous energization, the drum 17 would attain a velocity greater than the mean velocity of the shaft 30 as established by the escapement mechanism. Thus, as the contact 39 carried by the drum 17 advances, the contact 44 under the influence of the leaf spring 43 will tend to follow the same and to be maintained in engagement therewith by said leaf spring. As the lever structure 32, carrying the spring 43, is subject to intermittent motion, and as the mean angular velocity of the shaft 30 is less than the speed to which the motor 11 tends to accelerate the shaft 44 carrying the drum 17, it is obvious that after a limited number of beats of the escapement, the spring 43 will engage the stop 50 in one of its rest intervals, and will cause the contact 44 to be quickly separated from the contact 39, thereby interrupting the power supply to the motor 11 and removing the tendency of the drum 17 to further acceleration.

Because of the resiliency of the leaf spring 43 and the tension of the spring 46, stoppage of the contact 44 will not cause the escapement to come to rest; and upon the succeeding beat the scape wheel 31 will be released and the lever structure 32 will advance through one definite increment. If, during the interval between the separation of the contacts 44 and 39, the inertia of the motor and associated mechanism has carried the latter contact to a position beyond that to which it will be engaged by the contact 44, the circuit will remain open and no further power will be imparted to the motor during that particular beat of the escapement. The design of the mechanism is such that several beats of the escapement are possible under this condition, so that the contacts 44 and 39 must ultimately reengage, with a consequent restoration of power supply to the motor. Under normal operation the mechanism will quickly establish a condition in which the contacts 44 and 39 are momentarily brought into engagement once for each beat of the escapement, the contact being established with a snap action as the scape wheel 31 is released by the pallets 33, and quickly broken as the spring 43 comes into engagement with the momentarily stationary stop 50. Should the load which is driven by the motor 11 be increased, the tendency will be for the mechanism to slow down more quickly upon separation of the contacts 44 and 39, so that the duration of the interval of power application in each beat of the escapement will be correspondingly lengthened and a greater total amount of energy communicated to the motor.

Should the voltage of the power supply be abnormally increased, or should the mechanism driven by the motor be mechanically coupled to apparatus of a nature tending to rotate the shaft 14 in a "forward" sense independently of the motor 11, it is possible that during the interval of rest of the lever structure 32 the drum 17 might be advanced sufficiently far to bring the contact 40 into engagement with the contact 44. Under this condition, a circuit will be established from conductor 63 through contacts 43 and 40, collector ring 36, brush 38, conductor 62, and windings 57 and 58 of the motor 11 to conductor 65, whereby a negative torque will be developed in said motor, opposing any tendency toward abnormal acceleration in a "forward" sense.

Under actual operating conditions it has been found that smoothness of operation of the speed regulating device is materially enhanced by the presence of the fly wheel 51 on the shaft of the motor 11 or other rapidly rotating part of the mechanism directly connected to said motor. Under some conditions of operation it has been found that the most satisfactory performance attends the combination when the fly wheel 51 is tightly secured to the motor shaft, while under other conditions it has been found that operation of the device with the friction washer 52 adjusted to allow a slight slippage between the shaft and the fly wheel gives optimum results.

Figure 3:
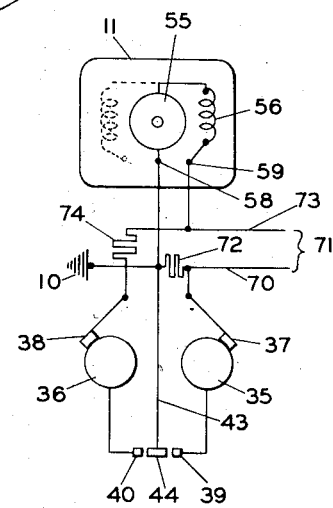
Figure 4:
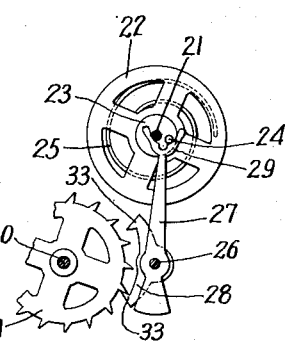
Fig. 4 is a view of a detail.

In Fig. 3 is shown an alternative arrangement of electrical circuits whereby the speed of the motor may be regulated by means of the controlling device described. While this circuit makes no provision for the application of a negative torque to the motor shaft, and is not applicable to use with a reversible motor, it is for purposes of uniformity shown in the drawing as applied to the same motor 11 as is used in the embodiment hereinbefore set forth but utilizing only the "forward" windings 55 and 56 of said motor, which terminate at the binding posts 58 and 59. The binding post 58 is connected to the base plate 10, and thus, as previously explained, to the leaf spring 43 and the contact 44. The contact 39 is connected through the collector ring 35 and the brush 37 to a conductor 70 forming one side of a source of electric power supply 71. A resistor 72 is connected between the conductor 70 and the terminal 59. A conductor 73 forming the other side of the power source 71, is directly connected to the binding post 59, and through a suitable resistor 74 is connected to the brush 38 and thus by means of the collector ring 36 to the contact 40.

The mechanical features of the operation of the invention embodying the circuit shown in Fig. 3 are identical with those of the form hereinbefore set forth; but the electrical circuit provides a performance which differs from the previous form principally by virtue of the fact that there are rendered available three distinct values of power input to the motor 11, depending upon the relationship of the contacts 39, 40, and 44. With the contacts in the position shown in Fig. 3, wherein the contact 44 is not engaged with either of the contacts 39 and 40, a circuit is provided for electric current from the source 71 through the conductor 70, the resistor 72, and the windings of the motor, to the conductor 73. Under this condition the motor will operate at a speed determined by the value of the resistor 72 in relation to the equivalent impedance of the motor. In the event of contacts 39 and 44 being brought into engagement by relative mechanical action of the drum 17 and the spring 43 as hereinbefore set forth, a path will be provided for current from the conductor 70 through the brush 37, the collector ring 35, the contacts 39 and 40, to the terminal 58 of the motor, whereby the series resistor 72 will be short-circuited, and full voltage of the source 71 applied to the windings of the motor, thus tending to increase the velocity of said motor and the mechanism driven thereby.

Should the contact 40 be brought into engagement with the contact 44, due to abnormal acceleration of the motor, a path will be provided for current from the spring 43 through said contacts 40 and 44, the collector ring 36, the brush 38, and the resistor 74. The resistor 74 will thus be connected across the terminals of the motor 11, so that said resistor and motor in parallel will be in series with the resistor 72 across the source of supply, whereby the total amount of current drawn through the resistor 72 will be greater than that drawn by the motor alone, with a consequent increase of potential drop across said resistor, and a corresponding decrease in voltage available at the terminals of the motor. Thus, upon closure of the contacts 40 and 44, there will be a tendency to slow down the operation of the motor. In this manner there has been provided an alternative control circuit, particularly applicable to use where the driven load is comparatively steady and where relatively high precision of speed regulation is demanded.

It will be obvious that the escapement mechanism may be fitted with any of the well-known means for adjusting the mean speed of operation, such as a movable abutment for the hairspring. It will further be apparent that temperature compensation may be effected by the use of a hairspring formed of material having a substantially zero coefficient of modulus of elasticity, such, for example, as that metal marketed under the trade name of "Elinvar" (Carson, R. W., in The Instrument Maker: July-August, 1935); or such compensation may be obtained by the use of a compensated balance wheel, well known in the horological art. Such adjustments and compensations are here mentioned only with a view to indicating their adaptability to the present invention; and for them no novelty is herein claimed.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. Means for regulating the speed of an electric motor, comprising connections for establishing a circuit between said motor and a source of electrical energy, a constant-speed device driven by said motor, a first movable contact driven by said constant-speed device, a second movable contact continuously advanced by said motor, said contacts being in said connections and mutually juxtaposed to cooperate in affecting the supply of electrical energy to said motor.

2. Means for regulating the speed of an electric motor, comprising connections for establishing a circuit between said motor and a source of electrical energy, an escapement, resilient means for driving said escapement from said motor, a first movable contact intermittently advanced by said escapement, a second movable contact continuously advanced by said motor, said contacts being in said connections and mutually juxtaposed to cooperate in affecting the supply of electric energy to said motor.

3. Means for regulating the speed of an electric motor, comprising connections for establishing a circuit between said motor and a source of electrical energy, a clockwork including an escapement, a spring for driving said clockwork, an element driven by said motor, said spring having abutments on said clockwork and said element respectively, whereby power to operate said clockwork is transmitted through said spring from said element, a first movable contact intermittently advanced by said escapement, a second movable contact continuously advanced by said motor, said contacts being in said connections and mutually juxtaposed to cooperate in affecting the supply of electric energy to said motor.

4. Means for regulating the speed of an electric motor, comprising connections for establishing a circuit between said motor and a source of electrical energy, a clockwork including an escapement, an extended spring for driving said clockwork, an element driven by said motor, one extremity of said spring being attached to said clockwork and the other extremity to said element, whereby power to operate said clockwork is transmitted through said spring from said element, a first movable contact intermittently advanced by said escapement, a second movable contact continuously advanced by said motor, said contacts being in said connections and mutually juxtaposed to cooperate in affecting the supply of electric energy to said motor.

5. Means for regulating the speed of an electric motor, comprising connections for establishing a circuit between said motor and a source of electrical energy, a device adapted to operate only at predetermined speed, means for driving said device from said motor, a first movable contact advanced by said device, a second movable contact advanced by said motor, said contacts being in said connections and mutually juxtaposed to cooperate in affecting the supply of electric energy to said motor.

6. Means for regulating the speed of an electric motor, comprising connections for establishing a circuit between said motor and source of electrical energy, a first movable contact, means for advancing said first movable contact intermittently and at a constant mean velocity, a second movable contact continuously advanced by said motor, said contacts being in said connections and mutually juxtaposed to cooperate in affecting the supply of electric energy to said motor.

7. Means for regulating the speed of an electric motor, comprising a constant speed device driven by said motor, a first movable contact advanced by said device, a second movable contact advanced by said motor and juxtaposed to said first contact to engage the same when the rate of advance of said second contact is less than that of first contact, a third movable contact also advanced by said motor, and juxtaposed to said first contact to engage the same when the rate of advance of said third contact is greater than that of said first contact, circuit means for connecting said motor to a source of electrical energy, said circuit means having a portion including said first and said second contacts, and being adapted to accelerate said motor upon engagement of said contacts, and another portion including said first and third contacts, and adapted to decelerate said motor upon the engagement of said contacts.

8. Means for regulating the speed of an electric motor, comprising connections for establishing a circuit between said motor and a source of electrical energy, an element rotated continuously by said motor about a fixed axis and carrying contact means in said connections, a member rotatable about said axis, means for causing said member to operate at a constant velocity, a second contact means carried by said member and included in said connections, said second contact means being juxtaposed to said first-named contact means to cooperate with the same in affecting the distribution of current from said source in said circuit and thereby modifying the speed of said motor.

9. Means for regulating the speed of an electric motor, comprising connections for establishing a circuit between said motor and a source of electrical energy, an element rotated continuously by said motor about a fixed axis and carrying contact means in said connections, a member rotatable about said axis, means driven by said motor for causing said member to operate at a constant velocity, a second contact means carried by said member and included in said connections, said second contact means being juxtaposed to said first-named contact means to cooperate with the same in affecting the distribution of current from said source in said circuit and thereby modifying the speed of said motor.

10. Means for regulating the speed of an electric motor, comprising connections for establishing a circuit between said motor and a source of electrical energy, an element rotated continuously by said motor about a fixed axis and carrying contact means in said connections, a member rotatable about said axis, means for causing said member to operate in successive equal impulses at a constant mean velocity, a second contact means carried by said member and included in said connections, said second contact means being juxtaposed to said first-named contact means to cooperate with the same in affecting the distribution of current from said source in said circuit and thereby modifying the speed of said motor.

11. Means for regulating the speed of an electric motor, comprising connections for establishing a circuit between said motor and a source of electrical energy, an element rotated continuously by said motor about a fixed axis and carrying contact means in said connections, a member rotatable about said axis, means for causing said member to operate in successive equal impulses at a constant mean velocity, contact means resiliently carried by said member and juxtaposed to said first-named contact means to engage the same intermittently and for intervals corresponding to said impulses and of durations governed by the relative angular position of said element and said member about said axis, said last-named contact means being included in said connections, and by engagement with said first named contact means adapted to affect the distribution of current from said source in said circuit, and thereby to modify the speed of said motor.

12. In combination, an electric motor adapted to have its speed adjusted in accordance with the mean value of a current following therein in a series of impulses, an element of mechanism rotatable about a fixed axis and continuously driven by said motor, first contact means carried by said element and following a definite path about said axis, a member rotatable about said axis, means for causing said member to be so rotated in a series of equal impulses and at a constant mean velocity, resilient means borne by said member, second contact means carried by said resilient means and juxtaposed to said first contact means to follow said path and to be brought into operative engagement with the same in each of said impulses, said resilient means yielding with relative angular displacement of said element and said member about said axis to permit duration of said engagement in each impulse to be governed by the magnitude of said displacement, and connections including said contact means between said motor and a source of electrical energy whereby the current flowing in said motor will be varied in impulses subject to the successive engagements of said contact means and the speed of the motor correspondingly adjusted.

13. Means for regulating the speed of an electric motor, comprising connections for establishing a circuit between said motor and a source of electrical energy, a constant-speed device intermittently driven by said motor, a first movable contact driven by said constant-speed device, a second movable contact advanced by said motor, said contacts being in said connections and mutually juxtaposed to cooperate in affecting the supply of electrical energy to said motor.

14. Means for regulating the speed of an electric motor, comprising connections for establishing a circuit between said motor and a source of electrical energy, an escapement, means connecting said motor with said escapement for driving the latter, a first movable contact intermittently driven by said escapement, a second movable contact advanced by said motor, said contacts being in said first mentioned connections and mutually juxtaposed to cooperate in affecting the supply of electrical energy to said motor.

15. Means for regulating the speed of a mechanism, comprising an electric motor mechanically connected to said mechanism to drive the same, means for establishing a circuit between said motor and a source of electrical energy, a constant-speed device driven by said motor, a first movable contact driven by said constant-speed device, a second movable contact continuously advanced by said mechanism, said contacts being included in said connections and mutually juxtaposed to cooperate in affecting the supply of electrical energy to said motor.

16. Means for regulating the speed of a mechanism, comprising an electric motor mechanically connected with said mechanism to drive the same, connections for establishing a circuit between said motor and a source of electrical energy, a device adapted to operate only at a predetermined speed, means for controlling the operation of said device from said motor, a first movable contact advanced by said device, a second movable contact advanced by said mechanism.

17. Means for regulating the speed of an electric motor, comprising a constant-speed device, resilient means interposed between said device and said motor for controlling operation of said device from said motor, an element driven by said motor, and means jointly controlled by said element and said constant speed device for controlling the supplying of electrical energy to said motor.

JOHN L. RUSSELL.